UNITED STATES PATENT OFFICE.

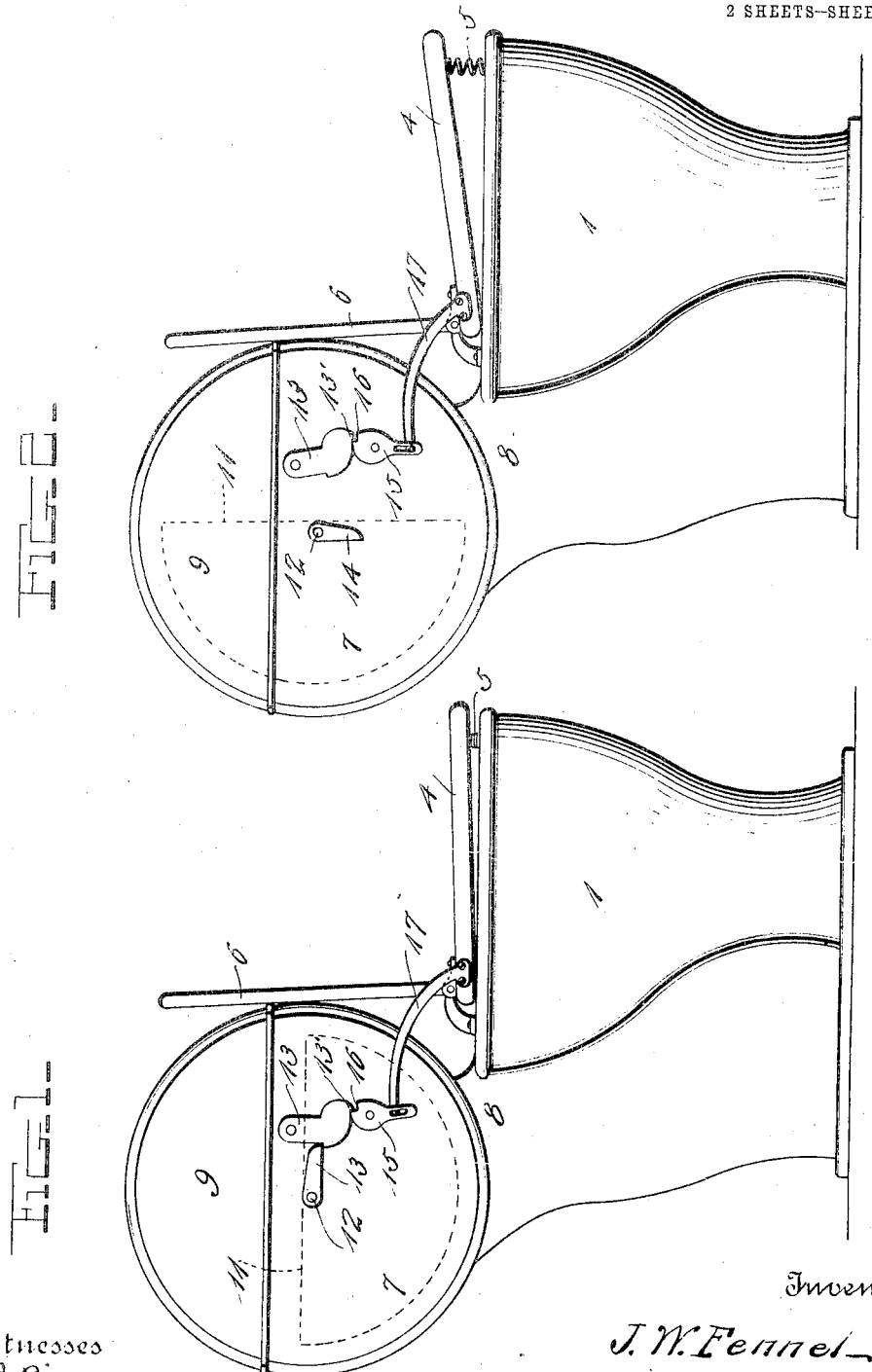

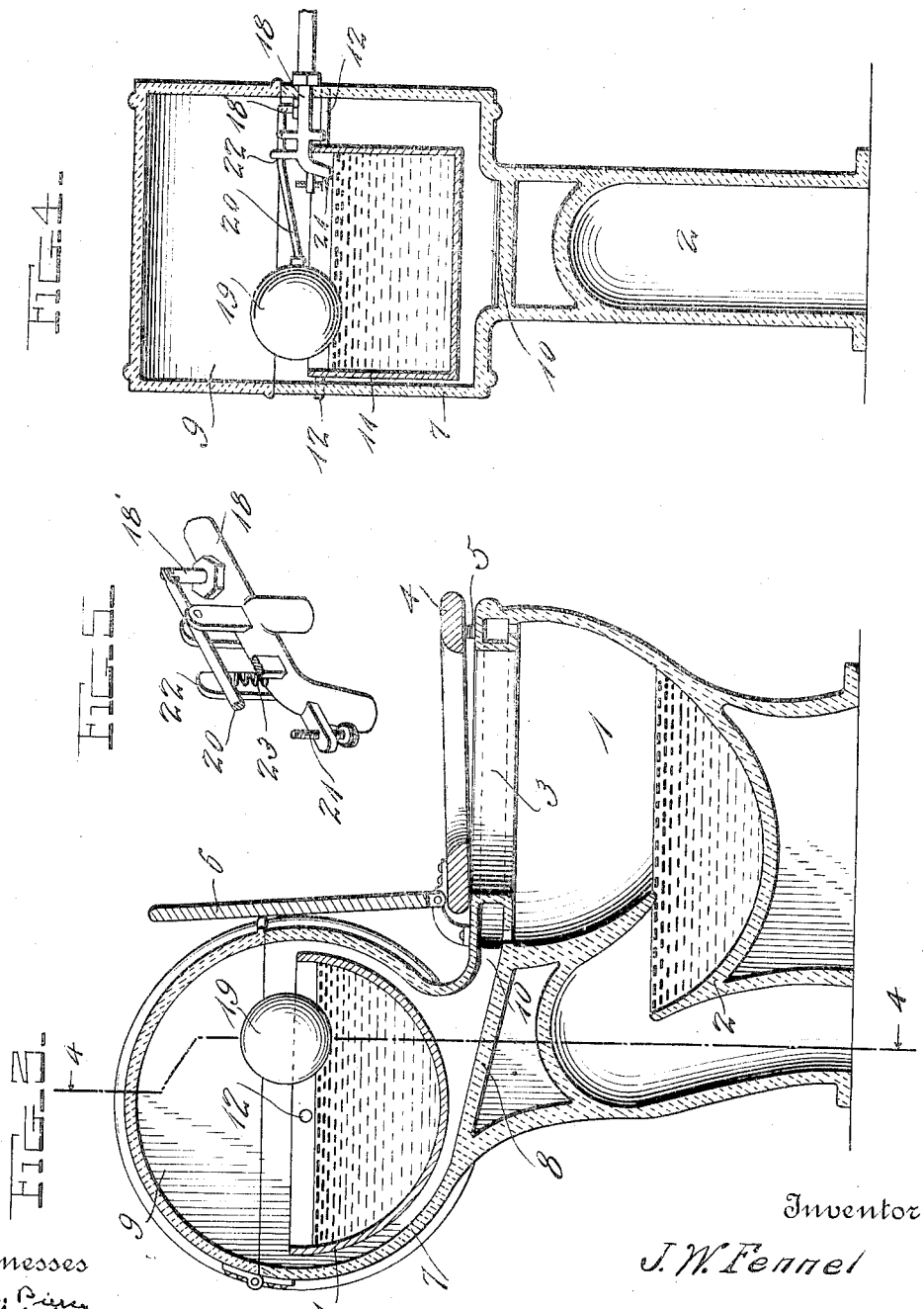

JACOB W. FENNEL, OF NEWBURGH, NEW YORK, ASSIGNOR OF ONE-HALF TO HENRY FLETCHER AND SONS, OF NEWBURGH, NEW YORK.

COMBINED CLOSET-BOWL AND FLUSH-TANK.

1,083,815.

Specification of Letters Patent.

Patented Jan. 6, 1914.

Application filed May 27, 1912. Serial No. 699,952.

*To all whom it may concern:*

Be it known that I, JACOB W. FENNEL, a citizen of the United States, residing at Newburgh, in the county of Orange and State of New York, have invented certain new and useful Improvements in Combined Closet-Bowls and Flush-Tanks; and I do declare the following to be a full, clear, and exact description of the invention, such as will enable others skilled in the art to which it appertains to make and use the same.

This invention relates to a combined one piece closet bowl and flush tank.

One object of the invention is to provide a one piece closet bowl and flush tank which may be readily installed, no pipes or connections being necessary, thereby avoiding all necessity of repairs.

Another object is to provide a tank so constructed that every particle of water and sediment is ejected at each flushing of the tank, thereby rendering it thoroughly sanitary, and avoiding the accumulation of dead water and sediment in the tank.

Another object is to provide a flushing tank in which a flushing plug is dispensed with, and which requires by its peculiar construction a smaller body of water than that required to accomplish the desired result in other tanks now in use.

With these and other objects in view, the invention consists of certain novel features of construction, and the combination and arrangement of parts as will be more fully described and claimed.

In the accompanying drawings: Figure 1 represents a side elevation of a combined closet and tank constructed in accordance with this invention, with the parts in normal position; Fig. 2 represents a similar view with the tilting tank in tilted position; Fig. 3 represents a longitudinal section thereof with the cover in open position; Fig. 4 is a transverse vertical section through the tank on line 4—4 of Fig. 3. Fig. 5 is an enlarged detail perspective view of the float controlling cock.

In the embodiment illustrated, a closet bowl 1 is shown composed of porcelain or other suitable material and of any desired shape, being provided with a water sealed trap 2 which is shown in the form of an S-trap, but may be of any other ordinary shape. This bowl is provided with the usual flush rim 3 which extends around the rim of the bowl 1 and is provided with a series of openings on the under side to provide for a discharge of water from the tank, to be hereinafter described, into the bowl 1 and through the trap 2 to a soil pipe (not shown). A seat of ordinary construction is pivotally mounted at its rear on the rear upper face of the bowl in the usual manner, and the front portion thereof is normally held raised by a series of coiled springs 5. A cover or top 6 is also preferably provided for the seat 4 and is made of the usual configuration, hinged at its rear end to the rear end of the seat.

A tank 7 is joined in a substantial manner to the rear end of the bowl, being disposed preferably at the rear and in a plane above said bowl, and connected thereto by a throat 8. This tank is preferably cylindrical in form, being formed of an upper and a lower section hingedly connected together at their rear edges, the upper section 9 forming the top of the tank and being adapted to be opened to afford access to the auxiliary reservoir or tank, to be described, and to the float valve which admits water to said tanks. The throat 8 which connects the bottom of the tank 7 with the bowl 1, preferably extends at an oblique angle thereto to permit the water in said tank to flow directly therefrom into the bowl without any residue remaining in said tank. A duct 10 connects the throat 8 with the flush rim 3 so that the water discharged from the tank 7 will be conveyed through said duct into the flush rim 3 and through the openings therein into the bowl 1.

A second trough-like collecting tank 11 is pivotally mounted in the tank 7, which, when filled to a certain point, becomes top heavy and will overturn if means are not provided to prevent it. This tank or auxiliary reservoir 11, as shown, is in the form of a semi-cylindrical member having its ends pivotally mounted in the ends of the tank 7, the pivots 12 thereof being disposed a little to one side of the true center of the tank 11, preferably the side nearest the bowl, to render one side of said tank somewhat heavier than the other to cause it to upset when filled with water, and when the locking mechanism thereof, to be described, is released.

To retain the pivotally mounted tank 11 in horizontal position to permit it to fill with water, a dog 13 is pivotally mounted on the outer face of one end of the tank 7 and is adapted to be engaged with the free end of a crank 14, the other end of which is rigidly connected with one of the pivots of the tank 11. A lever 15 provided with a notch 16 is pivotally connected with a trip lever 17 which is secured at one end to the seat 4 of the bowl. The dog 13 is also provided with a tooth 13' which is adapted to engage the recess or notch 16 in the lever 15, whereby the dog and lever 14 are held in connected condition which supports the tilting auxiliary tank 11 in upright operative position for receiving water. It will thus be obvious that the seat 4 being normally raised at its front end by the springs 5 when depressed will cause the lever 17 to move forward and lower the end of the lever 15, thereby engaging the notch 16 thereof with the tooth 13' on the dog 13, and when pressure is removed from the seat 4 the movement of the levers 17 and 15 is reversed and the dog 13 is tripped, thereby releasing the lever 14 and permitting the tank 11 to overturn and discharge its contents into the bowl 1 through the duct 10 and flush rim 3.

The water is conveyed to the tank 7 through a pipe 18 provided with a float controlled valve. This pipe projects through one wall of the tank 7, preferably to one side of the center of said tank, and the flow of water therethrough is controlled by a ball float 19, the stem 20 of which is connected to open and close the valve 18' in said pipe 18 on the raising and lowering of the water in the tank 11.

A set screw 21 is adjustably mounted in the end of the pipe 18 beyond the valve 18' and projects into the path of the stem 20 of the float, and is adapted to limit the downward movement of said float. To prevent the float from wabbling from side to side and thereby interfering with the free movement of the tank 11, guides for the stem of said float are provided in the form of upwardly projecting laterally spaced lugs 22 formed on the inner end of the pipe 18, and in order to lessen the shock of the sudden fall of the float a spring 23 is arranged under said stem between it and the face of the pipe 18. This end of the pipe in front of the valve 18' is preferably provided with two discharge openings, one of which discharges into the tank 11 and the other into the tank 7, the discharge into tank 7 being designed to create an after flow into the bowl 1 after the same has been flushed by the dumping of the tank 11.

It is thought that the operation of this improved bowl and tank will be evident from the above description.

After the tank 11 has been emptied by pressure being exerted on the seat 4 and then released, said tank will swing back automatically into upright position ready to receive water, in view of the fact that it is so constructed as to render it heavy enough to right itself after emptying and yet not sufficiently heavy to counteract the overbalancing weight of the water when the tank is full.

I claim as my invention:

A flushing tank comprising an outer tank or casing provided with an opening therein, a duct adapted to connect said opening with a water closet bowl, a tilting tank mounted within said outer tank with the walls thereof pivotally connected with said outer tank at points spaced in the true center of said tilting tank, a crank arm fixed to one of the pivots of said tilting tank, a dog pivotally mounted on the outer face of one end of said outer tank in position to be engaged by said crank arm, a trip lever adapted to be secured at one end to a closet bowl seat and to extend rearwardly, a notched lever fulcrumed on said outer tank end and pivotally connected with said trip lever, said dog having teeth arranged respectively for engagement with said lever and said crank arm, said trip lever being operable by the movement of a closet seat whereby it is adapted to release the inner tank.

In testimony whereof I have hereunto set my hand in presence of two subscribing witnesses.

JACOB W. FENNEL.

Witnesses:
  LOUIS D. FLETCHER,
  WINTON S. FLETCHER.